May 4, 1965 N. BARACOS ETAL 3,181,885
ANTIHARSHNESS INDEPENDENT FRONT WHEEL SUSPENSION SYSTEM
Filed May 31, 1962

NICK BARACOS
FREDERICK ROSKY
INVENTORS

BY John R. Faulkner
Clifford L. Sadler

ATTORNEYS

May 4, 1965  N. BARACOS ETAL  3,181,885
ANTIHARSHNESS INDEPENDENT FRONT WHEEL SUSPENSION SYSTEM
Filed May 31, 1962  2 Sheets-Sheet 2

NICK BARACOS
FREDERICK ROSKY
INVENTORS

ATTORNEYS

United States Patent Office 3,181,885
Patented May 4, 1965

3,181,885
ANTIHARSHNESS INDEPENDENT FRONT
WHEEL SUSPENSION SYSTEM
Nick Baracos and Frederick Rosky, Dearborn, Mich.,
assignors to Ford Motor Company, Dearborn, Mich., a
corporation of Delaware
Filed May 31, 1962, Ser. No. 198,906
8 Claims. (Cl. 280—124)

This invention relates to an automotive suspension system and more particularly to an independent suspension system that is adapted to reduce ride harshness.

In conventional automotive vehicle suspensions the chassis and body of the motor vehicle are resiliently supported to absorb the vertical movement of the road wheels resulting from road shock and bumps encountered. The wheels may also encounter forces having longitudinal components resulting in an uncomfortable ride to the passengers since conventional suspension systems do not provide a means for controlling or absorbing these longitudinal forces.

The term "harshness" has been applied by those skilled in the art to the transmittal of longitudinal force components to the vehicle body. In recent years suspension systems have been developed to reduce harshness by permitting resilient fore-and-aft movement of the road wheels.

Such suspension systems, generally referred to as compliance suspensions, have proven quite satisfactory in reducing harshness by applying a dampened spring means to counter the longitudinal force components and to return the wheels to their normal position when the forces are removed. In the usual compliance suspension, the spring means may comprise resilient bushing assemblies or resiliently supported drag struts diagonally mounted between a suspension arm and a sprung component of the vehicle.

In the suspension system of this invention, the countering of longitudinal force components is provided by a suspension member that performs a plurality of functions. For example, in the presently preferred embodiment of this invention, a spring member is provided that not only serves to effect transverse stability under roll but also provides a means for controlling longitudinal wheel movement. This same member returns the wheels to their normal position when the longitudinal forces are removed.

In this embodiment the spring member has a transversely extending central portion supported from the chassis and two diagonal end portions formed integrally with the central portion. The end portions are connected to unsprung suspension members, such as the outer ends of the suspension arms.

Novel mounting means are provided to connect the central portion of the spring member to the chassis so that it is preloaded in bending. When the wheels recede upon encountering longitudinal forces, the mounting means permits segments of the spring member to counter these forces with an increasing resistance to further movement. When the longitudinal forces are removed, the spring member is restored to its normal position by the preload at the center of the member.

The principal object of the present invention is to provide a suspension system for an automotive vehicle that reduces harshness by controlling the recession rate of the wheel.

Another object of this invention is to combine several functions of the suspension system of a motor vehicle into one torsion spring member, thereby eliminating the need for separate assemblies.

More specifically, it is an object of this invention to provide an embodiment of a transversely extending torsion spring member formed integrally with two diagonally extending end portions that is mounted in such a manner to act as a means to counter the longitudinal force components encountered by the road wheels of the vehicle.

Other objects and advantages of the present invention will become more apparent as the specification is considered in connection with the attached drawings, in which.

Figure 1:
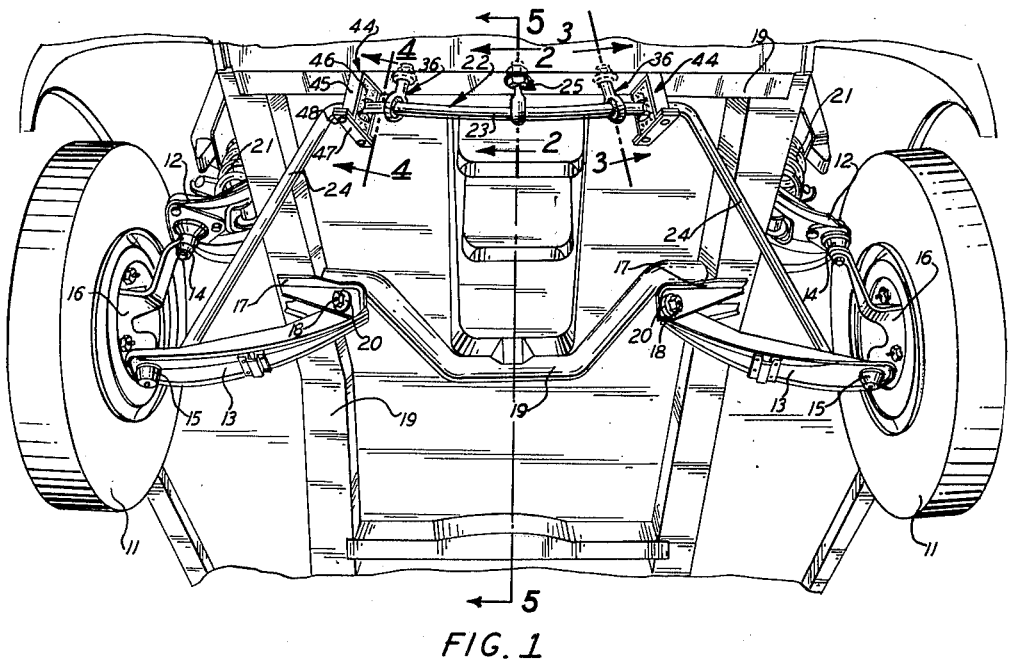
FIGURE 1 is a perspective view from beneath the front portion of a motor vehicle incorporating the present invention.

Referring now to the drawings, in FIGURE 1 can be seen an automotive suspension system generally referred to as a compliance suspension. Road wheels 11 are supported by an upper control arm 12 and a lower control arm 13 mounted at right angles to the longitudinal axis of the vehicle for swinging movement in substantially vertical planes. Both control arms 12 and 13 are joined by ball joint assemblies 14 and 15 to a spindle 16 supporting the road wheel 11.

The inboard end of the lower control arm 13 is pivotally connected to a bracket 17 by a pivot pin 18. The bracket 17 is attached to a chassis member 19 by welding or any other means known in the art. A rubber bushing 20 connects the pin 18 of arm 13 to the bracket 17 and allows the lower control arm 13 to move or recede slightly in a longitudinal direction. The pivot pin 18, in addition, permits normal swinging movement to accommodate jounce and rebound of the road wheel 11.

The pivotal connection for the upper control arm 12 is conventional and not shown. A conventional coil spring 21 is shown between the upper control arm 12 and the chassis to reduce the transmission of road shock to the passengers riding in the automobile.

Figure 5:
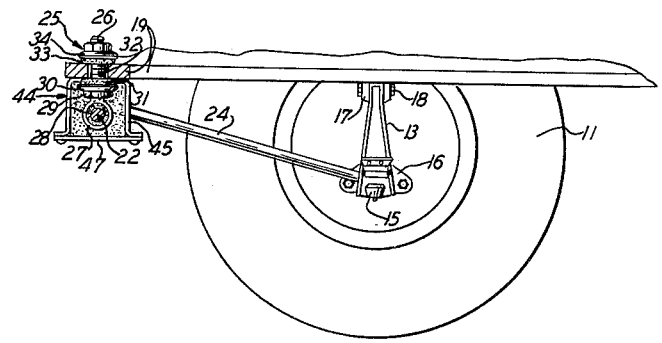
FIGURE 5 is a section of the front portion of the motor vehicle taken along the longitudinal center line of the vehicle.

A novel torsion spring member, generally designated 22, is installed on the underside of the front of the vehicle and provides antiroll stabilizing action for the vehicle as one of its principal functions. The spring member 22 has a central portion 23 that extends generally transversely of the vehicle and is longitudinal spaced forwardly from the lower control arm 13. As seen in FIGURES 1 and 5, the spring member 22 has integrally formed end portions 24 that extend diagonally rearwardly thereof. The outer ends of the end portions 24 are connected to the lower control arms 13 inboard from the ball joint assemblies 14 and 15. The end portions 24 function in the manner of drag struts to control the movement of arms 13.

Figure 2:
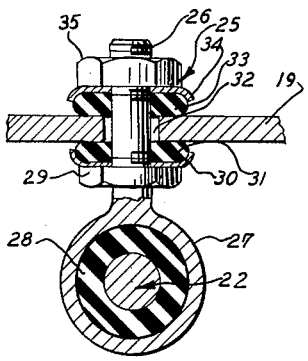
FIGURE 2 is a section taken at line 2—2 of FIGURE 1.

A bending load is applied to the center of the central portion of the spring member 22 by a hanger 25 placed under compression to stress the center of the spring member 22. This compression hanger 25, which can be best seen in FIGURE 2, comprises an eyebolt having a threaded stud part 26 terminating in and eyelet 27 that is lined with a resilient sleeve 28 to journal the spring member 22. The threaded stud 26 receives a nut 29, a washerlike metal seat 30 and a resilient washer 31 before it is extended through an opening 32 in the chassis member 19. After the stud 26 is projected through the opening 32, a second resilient washer 33, a second metal seat 34, and a second nut 35 are threaded onto the stud 26. As can be seen in FIGURE 2, the nuts 29 and 35 can be adjusted in a vertical direction to place a preselected bending load to bow the center of the spring member 22 in a downward direction. The compression hanger 25 is mounted to the chassis member 19 so that the eyelet 27 journals the central portion 23 of the spring member 22 to permit the transmittal of torsional forces from one end of the spring member 22 to the other end thereof.

Figure 3:
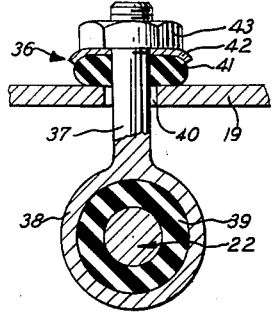
FIGURE 3 is a section taken at line 3—3 of FIGURE 1.
Figure 4:
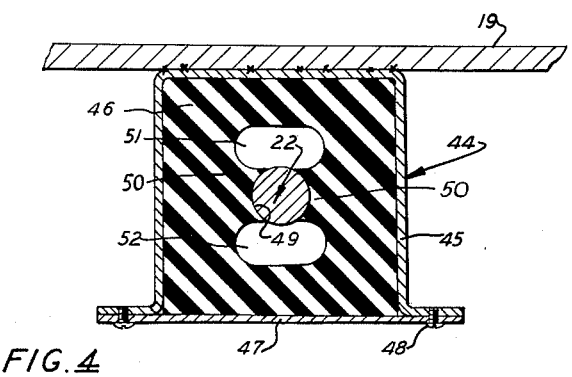
FIGURE 4 is a section taken at line 4—4 of FIGURE 1.

The end segments of the central portion 23 of the spring member 22 are each supported by a floating hanger member 36 as can be best seen in FIGURE 3. These floating hanger members 36 comprise an eyebolt having a threaded stud part 37 terminating in an eyelet 38 at one end. The eyelet 38 is lined with a resilient sleeve 39 to provide an insulated bearing for the spring member 22. The stud 37 of the hanger member 36 extends upwardly through an opening 40 in the chassis member 19. From the threaded upper end of the stud 37 is a resilient washer 41, a washerlike seat 42 and a nut 43. The hangers 36 are normally under a tensile load and function as a reaction member for the compression hanger 25. The hanger member 36 may permit limited vertical movement of the end segments of the spring member 22 relative to the chassis member 19.

A resilient puck 44 is mounted at each end segment of the central portion 23 of the spring member 22 outboard of the hanger member 36. Each resilient puck 44 comprises a sheet metal housing 45 which is welded to the chassis member 19. A resilient block 46 is contained in the sheet metal housing 45 by a sheet metal cover 47 fastened to the housing 45 by sheet metal screws 48. This resilient block 46 is provided with an opening 49 to which the spring member 22 is extended. This resilient block 46 has projections 50 within the opening 49 that are bonded to the curved side surfaces of the spring member 22 resulting in voids 51 and 52 above and below the spring member 22. This construction resiliently resists severe longitudinal movement of the spring member 22 but permits the latter to have relatively unrestricted vertical movement.

From the description, it can be seen that the spring member 22 serves a plurality of functions. One function of the spring member 22 is to provide antiroll control in torsion to reduce the tilting and swaying movement of the sprung portion of the vehicle during body roll.

The compression hanger 25 and the hanger members 36 journal the spring member 22 to permit its free rotation under torsional load. The construction of the resilient puck 44 also allows for the rotation of the projections 50 bonded to the spring member 22 without being detached when the latter is in torsion.

A further function of the spring member 22 is to provide a means for controlling wheel recession to reduce ride harshness. The compression hanger 25 applies a preload to the center of the central portion 23 of the spring member 22 to place the hanger members 36 in tension, thereby retaining the latter in a substantially vertical position. When a longitudinal force is encountered by the road wheels 11, it is transmitted by the end portions 24 to the central portion 23 of the spring member 22 to cause the end segments of the central portion 23 to be displaced, resulting in a swinging movement of the hanger members 36 in a pendulum fashion. As these hanger members 36 are in tension, an increasing rate of resistance to this movement is developed upon the increasing longitudinal displacement of the end segments. Upon removal of the longitudinal forces, the wheel will be restored to its normal position by the return of the hanger members 36 to the substantially vertical alignment with the chassis member 19.

The preload on the center of the spring member 22 has to be selected to allow for sufficient recovery rate so that the hanger members 36 remain substantially vertical when the longitudinal forces are removed to eliminate tire drag while the vehicle is being driven down the road. The adjustability feature of the compression hanger 25 will permit the altering of the bending stress exerted on the center of the spring member 22 to allow variations in the restraining forces countering the recession of the wheels to meet the requirements of the vehicle.

Severe longitudinal forces acting on the spring member 22 when the vehicle is accelerated or decelerated at a relatively fast rate are resiliently absorbed and controlled by the pucks 44.

It will be understood that the invention is not to be limited to the exact construction shown and described but that various changes and modifications may be made without departing from the spirit and scope of the invention as defined in the appended claims.

What is claimed as new is:

1. In a motor vehicle suspension system having sprung and unsprung components, suspension means interconnecting said components, said means being adapted to support said unsprung components for longitudinal movement relative to said sprung components, torsion spring means interposed between said components, and means for mounting said torsion spring means on said sprung component, one portion of said mounting means further being constructed and arranged to preload said torsion spring means in bending, the other portion of said mounting means countering the longitudinal movement of said unsprung components with an increasing rate upon increasing longitudinal displacement of said unsprung components relative to said sprung components.

2. In a motor vehicle having a sprung portion, a pair of road wheels at opposite sides of said sprung portion, a pair of generally transversely extending suspension arms, each of said suspension arms supporting one road wheel at its outer end and having its inner end connected to said sprung portion, said inner connection being adapted to allow slight longitudinal movement of said road wheel relative to said sprung portion, a torsion spring member having a central portion extending generally transversely of said vehicle, said torsion spring member having integral end portions at opposite sides of the vehicle extending generally diagonally with respect to said transverse central portion, the end of each of said integral end portions being connected to one of said suspension arms, and means mounting said torsion spring member to said sprung portion, one portion of said mounting means constructed to place the center of said torsion spring member in bending, the other portion of said mounting means constructed and arranged to impart an increasing restraining force to movement of said end portions upon an increase in the longitudinal displacement of said road wheels relative to said sprung portion.

3. In a motor vehicle suspension system including, in combination, a sprung portion, a pair of road wheels at opposite sides of said sprung portion, a pair of generally transversely extending suspension arms, each of said suspension arms supporting one road wheel at its outer end and having its inner end connected to said sprung portion, said inner connection being adapted to allow slight longitudinal movement of said road wheels relative to said sprung portion, a torsion spring member having a central portion extending generally transversely of said vehicle and being longitudinally spaced from said suspension arms, said torsion spring member having integrally formed end portions extending generally diagonally with respect to said central portion, the end of each of said integral end portions being connected to one of said suspension arms, hanger means connecting segments of said central portion of the torsion spring member remote from its center to said sprung portion, and other means mounting the central portion of said torsion spring member to said sprung portion, said other mounting means placing said hanger means under tension, said hanger means allowing limited vertical movement of the segments of the torsion spring member relative to said sprung portion, said hanger means under tension imparting a restraining force to longitudinal movement of the segments of said torsion spring member relative to said sprung portion thereby countering the longitudinal movement of said end portions of said torsion spring member upon the longitudinal displacement of said suspension arms supporting said road wheels relative to said sprung portion.

4. In a motor vehicle suspension system including, in combination, a sprung portion, a pair of road wheels at opposite sides of said sprung portion, a pair of generally transversely extending suspension arms, each of said suspension arms supporting one road wheel at its outer end and having its inner end connected to said sprung portion, said inner connection being adapted to allow slight longitudinal movement of said road wheels relative to said sprung portion, a torsion spring member having a central portion extending generally transversely of said vehicle and being longitudinally spaced from said suspension arms, said torsion spring member having integrally formed end portions extending generally diagonally with respect to said central portion, the outer end of each of said integral end portions being connected to one of said suspension arms, hanger means mounting segments of said torsion spring member remote from its center on said sprung portion and being adapted to allow for limited movement of the segments of said torsion spring member relative to said sprung portion, and compression means connecting the central portion of said torsion spring member to said sprung portion and being adapted to place the center of said torsion spring member in bending and said hanger means in tension, said hanger means under tension imparting a restraining force to the movement of the torsion spring member relative to said sprung portion thereby countering the longitudinal movement of said suspension arms upon the longitudinal displacement of said road wheels relative to said sprung portion.

5. In a motor vehicle suspension system including, in combination, a sprung portion, a pair of road wheels at opposite sides of said sprung portion, a pair of generally transversely extending suspension arms, each of said suspension arms supporting one road wheel at its outer end and having its inner end connected to said sprung portion, said inner connection being adapted to allow slight longitudinal movement of said road wheels relative to said sprung portion, a torsion spring member having a central portion extending generally transversely of said vehicle and being longitudinally spaced from said suspension arms, said torsion spring member having integrally formed end portions extending generally diagonally with respect to said central portion, the end of each of said integral end portions being connected to one of said suspension arms, hanger means mounting segments of the central portion of said torsion spring member remote from its center on said sprung portion and being adapted to allow for limited movement of the segments of said torsion spring member relative to said sprung portion, and compression means connecting the central portion of said torsion spring member to said sprung portion and being adapted to place said center of said torsion spring member in bending and said hanger means in tension, said hanger means under tension imparting a restraining force to the movement of the torsion spring member relative to said sprung portion, thereby countering the longitudinal movement of said suspension arms upon the longitudinal displacement of said road wheels relative to said sprung portion, and resilient means being attached to said sprung portion to resiliently resist the longitudinal movement of said torsion spring member with respect to said sprung portion.

6. In a motor vehicle suspension system including, in combination, a sprung portion, a pair of road wheels at opposite sides of said sprung portion, a pair of generally transversely extending suspension arms, each of said suspension arms supporting one road wheel at its outer end and having its inner end connected to said sprung portion, said inner connection being adapted to allow slight longitudinal movement of said road wheels relative to said sprung portion, a torsion spring member having a central portion extending generally transversely of said vehicle and being longitudinally spaced from said suspension arms, said torsion spring member having integrally formed end portions extending generally diagonally with respect to said central portion, the end of each of said integral end portions being connected to one of said suspension arms, a pair of floating hanger members, each mounting a segment of the central portion of said torsion spring member remote from its center on said sprung portion and being adapted to allow for limited movement of each segment relative to said sprung portion, and an adjustable compression hanger connecting the central portion of said torsion spring member to said sprung portion and being adapted to place the center of said torsion spring member in bending and said floating hanger members in tension, said floating hanger members under tension imparting a restraining force to the movement of the segments and the end portions of the torsion spring member relative to said sprung portion, thereby countering the longitudinal movement of said suspension arms upon the longitudinal displacement of said road wheels relative to said sprung portion, and resilient means being attached to said sprung portion to resiliently resist the longitudinal movement of said torsion spring member with respect to said sprung portion.

7. The suspension system as described in claim 5 and which is further characterized in that said resilient means comprises at least one resilient puck encompassing said torsion spring member, said resilient puck being in contact with portions of the front and rear surfaces of said torsion spring member and having a void above and a void below the latter.

8. In a motor vehicle suspension system having sprung and unsprung components, suspension means interconnecting said components, said means adapted to support said unsprung components for longitudinal and vertical movement relative to said sprung component, torsion spring means having a transversely extending center portion and two diagonally extending end portions, the outer ends of said end portions being connected to said suspension means, means for mounting the center portion of said torsion spring means to said sprung component, said mounting means placing the center of said center portion under a bending load and the end segments of said center portion under tension, said mounting means allowing said center portion of said torsion spring means to be torsionally stressed to counter vertical movement of said unsprung components relative to said sprung component, the end segments of said center portion being slightly movable in a longitudinal direction by longitudinal force components effected by longitudinal displacement of said unsprung components relative to said sprung component, said bending load on said center portion imparting an increasing resistance to longitudinal movement of said end segments, the end segments of said center portion being returned to their original position by counter forces created by the bending load exerted on the center of said center portion upon removal of the longitudinal force components acting on said unsprung components.

References Cited by the Examiner

UNITED STATES PATENTS

| 2,961,253 | 11/60 | Allison | 280—96.2 |
| 3,033,587 | 5/62 | Perish | 280—96.2 |

FOREIGN PATENTS

| 1,052,389 | 9/53 | France. |

A. HARRY LEVY, *Primary Examiner.*

LEO FRIAGLIA, *Examiner.*